United States Patent [19]
Baran et al.

[11] 3,832,382
[45] Aug. 27, 1974

[54] 3,11-DIOXOOLEANA-5,12-DIEN-30-OIC ACID, ESTERS THEREOF AND DERIVATIVES
[75] Inventors: John S. Baran, Winnetka; Barnett Pitzele, Skokie, both of Ill.
[73] Assignee: G. D. Searle & Co., Chicago, Ill.
[22] Filed: May 29, 1973
[21] Appl. No.: 364,974

Related U.S. Application Data
[63] Continuation-in-part of Ser. No. 172,903, Aug. 18, 1971, Pat. No. 3,755,414.

[52] U.S. Cl............ 260/468.5, 210/514.5, 424/305, 424/317
[51] Int. Cl...................... C07c 61/36, C07c 69/74
[58] Field of Search...................... 260/514.5, 418.5

[56] References Cited
OTHER PUBLICATIONS
Merck Index, 8th Ed. p. 502.

*Primary Examiner*—Robert Gerstl
*Attorney, Agent, or Firm*—John A. Dhuey

[57] ABSTRACT

The above-captioned compounds are manufactured from alkyl esters of 3-nor-4,4-desmethyl-4-isopropylidene-11-oxoolean-12-en-30-oic acid. The instant compounds are useful as pharmacological agents as is evidenced by their antibacterial and antiviral activity.

6 Claims, No Drawings

3,11-DIOXOOLEANA-5,12-DIEN-30-OIC ACID, ESTERS THEREOF AND DERIVATIVES

This application is a continuation-in-part of our copending application Ser. No. 172,903, filed Aug. 18, 1971 now U.S. Pat. No. 3,755,414.

The present invention is concerned generally with derivatives of the oleanane family. More particularly, the present invention is concerned with compounds of the following general formula

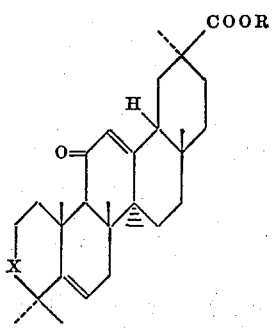

wherein R is hydrogen or a lower alkyl radical containing 1–7 carbon atoms inclusive and X is a carbonyl or β-hydroxymethylene radical.

For the purposes of this invention the lower alkyl radicals represented are illustrated by methyl, ethyl, propyl, butyl, pentyl, hexyl, heptyl and their corresponding branched-chain isomers.

The instant compounds are useful as pharmacological, e.g. antiviral and antibacterial, agents.

The antiviral utility of the instant compounds is evident from the results of a standardized test for their capacity to inhibit the growth of Influenza A (Strain 575). In this test, cell cultures of primary Rhesus monkey kidney maintained in 25-ml. plastic flasks and each containing test compound at concentrations of 625, 125, 25, 5 or 1 γ/ml. are prepared in pairs. These flasks, and an identical pair of flasks containing no test compound, are each inoculated with a dose of Influenza A (Strain 575) previously shown to produce maximum hemadsorption and minimum cytopathogenic effects after a 24-hour incubation. Where the cultures contain test compound, the virus is added 1 hour after addition of the compound to the culture. After 24-hour incubation of the cultures, the supernatant fluids are removed and 3.0 ml. of a 0.4 percent suspension of guinea pig erythrocytes is added to each flask. The flasks are then incubated at 4°C. in a horizontal position for 30 minutes. The flasks are rocked every 10 minutes during the incubation period. After this incubation, the red cell suspension is decanted from each flask, the flasks are washed twice with 3.0 ml. of pH 7.4 phosphate buffer solution to remove unadsorbed red cells, and 3.0 ml. of distilled water is then added to lyse the adsorbed cells. The flasks are further incubated at 37°C. for 30 minutes in a horizontal position and rocked every 10 minutes. After this incubation, the fluid contents of the pairs of flasks are combined to form an assay unit and are placed at room temperature for 15–30 minutes to allow settling of cellular debris. A pair of control flasks identical with the above, except for the absence of test compound and virus inoculation, is run concurrently. The resulting hemoglobin solutions from each assay unit are read for optical density in a Beckman spectrophotometer at about 415 millimicrons. A test compound is considered active if, at one of the tested levels, it reduces the optical density reading by at least 50 percent, relative to the virus control.

The antibacterial utility of the instant compounds is evident from the results of standardized tests for their capacity to prevent growth of Bacillus subtilis and/or Erwina sp. In these tests, nutrient broth (manufactured by Baltimore Biological Laboratories or Difco) is prepared at twice the concentration recommended by the manufacturer, sterilized, and inoculated with 2 percent (by volume) of a culture of B. subtilis or Erwina sp. Meanwhile, compound is heated in sterile distilled water at a concentration of 2,000 γ/ml. and a temperature of 80°C. for 20 minutes. An equivolume mixture of this compound preparation and the inoculated broth is incubated aerobically at 37°C. and then examined grossly for growth of the test organism. The incubation is 24–48 hours for Erwina sp. and 20–24 hours for Bacillus subtilis. If growth of the test organism is observed, the compound is considered inactive. If no such growth is observed, the incubated mixture is serially diluted and mixed with an inoculated broth of the same composition as before, excepting that the concentration is halved and 1 percent (by volume) of the culture instead of 2 percent is incorporated. Amounts of the latter broth added are such that concentrations of 100, 10 and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

The compounds of this invention are conveniently prepared by a series of reactions beginning with the hydroxylation of the appropriate alkyl ester of 3-nor-4,4-desmethyl-4-isopropylidene-11-oxo-18β-olean-12-en-30-oic acid. That hydroxylation is conveniently effected with osmium tetroxide and the resulting glycol then is cleaved with lead tetraacetate to yield the carbonyl substituent. For example, when methyl 3-nor-4-isopropylidene-4,4-desmethyl-11-oxo-18β-olean-12-en-30-oate is treated with osmium tetroxide in pyridine, methyl 3-nor-4-hydroxy-4-(hydroxyisopropyl)-4,4-desmethyl-11-oxo-18β-olean-12-en-30-oate is produced. Subsequent treatment of the latter compound with lead tetraacetate in benzene affords methyl 3-nor-4,4-desmethyl-4,11-dioxo-18β-olean-12-en-30-oate.

The 4-carbonyl compound is then allowed to react with Grignard reagent to form, for example, the 4-hydroxy-4-methyl derivative, which, when further allowed to react with thionyl chloride, yields the 4-methyl-Δ⁴ compound. In that manner, when methyl 3-nor-4,4-desmethyl-4,11-dioxo-18β-olean-12-en-30-oate is treated with methyl magnesium bromide, methyl 3-nor-4-hydroxy-4-desmethyl-11-oxo-18β-olean-12-en-30-oate results. Allowing the latter compound to react with thionyl chloride affords methyl 3-nor-4-desmethyl-11-oxo-18β-oleana-4,12-dien-30-oate. The Δ⁴ double bond is hydroxylated again with osmium tetroxide and the resulting glycol is cleaved with lead tetraacetate in the same manner as noted above to yield the 4,5-seco-3,5,11-trioxo alkyl ester derivative of 4,4-desmethyl-olean-12-en-30-oic acid. Typically, treatment of methyl 3-nor-4-desmethyl-11-oxo-18β-oleana- 4,12-dien-30-oate with osmium tetroxide in pyridine affords methyl 3-nor-4,5-dihydroxy-4-desmethyl-11-oxo-18β-olean-12-en-30-oate. Cleavage of that compound with lead tetraacetate in benzene yields methyl 4,5-seco-4,4-desmethyl-3,5,11-trioxo-18β-olean-12-en-30-oate. Cyclization to form the 3,11-dioxo-$\Delta^{4,12}$ alkyl ester of oleanan-30-oic acid is accomplished with an alkali metal hydroxide such as potassium hydroxide. For example, contacting methyl 4,5-seco-4,4-desmethyl-3,5,11-trioxo-18β-olean-12-en-30-oate with potassium hydroxide in methanol affords methyl 4,4-desmethyl-3,11-dioxo-18β-oleana-4,12-dien-30-oate.

The 4,5-seco compounds may alternatively be produced by the ozonolysis and subsequent reduction with zinc and acetic acid of the 4-desmethyl-$\Delta^{4,12}$ alkyl esters of 11-oxooleanan-30-oic acid. Thus, when methyl 4-desmethyl-11-oxo-18β-oleana-4,12-dien-30-oate is treated with ozone and then with zinc and acetic acid, methyl 4,5-seco-4,4-desmethyl-3,5,11-trioxo-18β-olean-12-en-30-oate is produced.

The 4,5-seco compounds may alternatively be produced by the ozonolysis and subsequent reduction with zinc and acetic acid of the 4-desmethyl-$\Delta^{4,12}$ alkyl esters of 11-oxooleanan-30-oic acid. Thus, when methyl 4-desmethyl-11-oxo 18β oleana-4,12-dien-30-oate is treated with ozone and then with zinc and acetic acid, methyl 4,5-seco-4,4-desmethyl-3,5,11-trioxo-18β-olean-12-en-30-oate is produced.

Subsequent treatment of the alkyl esters of 4,4-desmethyl-3,11-dioxo-18β-oleana-4,12-dien-30-oate with methyl iodide, under refluxing conditions and in the presence of potassium tert.-butoxide and a solvent such as tert.-butanol, affords the alkyl esters of 3,11-dioxo-18β-oleana-5,12-dien-30-oic acid. Typically, methyl 4,4-desmethyl-3,11-dioxo-18β-oleana-4,12-dien-30-oate is allowed to react in the above manner to afford methyl 3,11-dioxo-18β-oleana-5,12-dien-30-oate.

Reduction of the carbonyl moiety at the 3-position conveniently is accomplished with metallic hydride reducing agents. For example, methyl 3β-hydroxy 11-oxo-18β-oleana-5,12-dien-30-oate is produced from methyl 3,11-dioxo-18β-oleana-5,12-dien-30-oate by contact with lithium tri-tert.-butoxy aluminum hydride.

The corresponding acids of this invention are obtained by refluxing the esters with lithium iodide in the presence of a high boiling aromatic amine such as collidine. Thus, for example, when methyl 3β-hydroxy-11-oxo-18β-oleana-5,12-dien-30-oate is treated with lithium iodide in 2,4,6-collidine, 3β-hydroxy-11-oxo-18β-oleana-5,12-dien-30-oic acid is produced.

The invention will appear more fully from the examples which follow. They are not to be construed as limiting the invention either in spirit or in scope as many variations in materials and methods will be apparent to one skilled in the art. In the following examples temperatures are given in degrees Centigrade (°C.) and quantities of material are presented in parts by weight unless parts by volume is specified. The relationship existing between parts by weight and parts by volume is the same as that existing between grams and milliliters.

EXAMPLE 1

To a stirred mixture of 5 parts of methyl 3-nor-4-isopropylidene-4,4-desmethyl-11-oxo-18β-olean-12-en-30-oate and 28.1 parts of pyridine is added over a period of about 30 minutes, 57.1 parts by volume of a solution of 50 parts of osmium tetroxide dissolved in 982 parts of pyridine. Stirring is continued for an additional 30 minutes and then 3 parts by volume of the above osmium tetroxide-pyridine solution is added. After stirring for an additional 30 minutes, 5 parts by volume of the osmium tetroxide-pyridine solution is added and the mixture is stirred for about 10 minutes. Then that mixture is quenched with a solution of 5.7 parts of sodium bisulfite, 86 parts of water and 42.2 parts of pyridine. The mixture is heated on a steam bath for about 2 hours and then added rapidly to a mixture of about 1,500 parts of water and ice. Stirring is continued for about 64 hours after which 1,000 parts of water is added. The mixture is filtered and the collected precipitate is washed with water and air dried. The crude product is dissolved in a 1:1 mixture of chloroform and methanol and filtered. Benzene is added to the filtrate and that solution is evaporated to dryness to yield, after recrystallization from methylene chloride-methanol-benzene, pure methyl 3-nor-4α-hydroxy-4β-(hydroxyiso=propyl)-4,4-desmethyl-11-oxo-18β-olean-12-en-30-oate. That compound melts at about 199°–201° and displays nuclear magnetic resonance maxima at 51, 60, 68, 69, 76 85, 223 and 342 Hertz.

EXAMPLE 2

17 Parts of methyl 3-nor-4α-hydroxy-4β-(hydroxy=isopropyl)-4,4-desmethyl-11-oxo-18β-olean-12-en-30-oate is dissolved in 879 parts of benzene and filtered. The filtrate is treated with a slurry of 18 parts of lead tetraacetate in 220 parts of benzene in portions until thin layer chromatography indicates that the starting material is depleted. Then the mixture is stirred, after the addition of 5.5 parts of ethylene glycol, for 15 minutes and filtered. The filtrate is washed with water, dried over anhydrous magnesium sulfate and evaporated to dryness to yield crude product. Recrystallization of the crude product from methylene chloride-methanol affords pure methyl 3-nor-4,4-desmethyl-4,11-dioxo-18β-olean-12-ene-30-oate displaying a maximum in the ultraviolet spectrum at about 247.5 millimicrons and maxima in the nuclear magnetic resonance spectrum at about 50, 60, 69, 84, 223 and 347 Hertz.

EXAMPLE 3

To a solution of 10 parts of methyl 3-nor-4,4-desmethyl-4,11-dioxo-18β-olean-12-en-30-oate and 300 parts by volume of a 1:1 tetrahydrofuran-ethyl ether solution is added dropwise 8 parts by volume of 3N methyl magnesium bromide in ether solution. That mixture is allowed to react until thin layer chromatography indicates that the starting material is consumed. Acetic acid and water are added to the mixture which is then concentrated to a small volume and diluted with benzene. The benzene solution is washed with water, then with aqueous sodium bicarbonate, and dried over anhydrous magnesium sulfate. After evaporation to dryness, there is obtained methyl 3-nor-4-hydroxy-4-desmethyl-11-oxo-18β-olean-12-en-30-oate which melts at about 201°–203° and exhibits nuclear magnetic resonance maxima at about 50, 67, 78, 82, 222, and 345 Hertz.

EXAMPLE 4

A stirred solution of 36.1 parts of methyl 3-nor-4-hydroxy-4-desmethyl-11-oxo-18β-olean-12-en-30-oate in 283 parts of pyridine is cooled under a nitrogen atmosphere to about −15° in a sodium chloride-ice water bath. To that solution is added 11.78 parts of thionyl chloride and the solution is allowed to stir for about 20 minutes. Then 633 parts of benzene containing 25.3 parts of ethanol is added in one portion. The resulting solution is washed with aqueous 4N hydrochloric acid until the reaction mixture is acidic and then it is washed successively with water and sodium bicarbonate, dried over anhydrous magnesium sulfate, filtered and evaporated to dryness. After recrystallization from methylene chloride-methanol, methyl 3-nor-4-desmethyl-11-oxo-18β-oleana-4,12-dien-30-oate is obtained. That material displays a maximum in the ultraviolet spectrum at about 248.5 millimicrons and absorption maxima in the infrared spectrum at about 5.78, 6.02 and 6.20 microns.

EXAMPLE 5

A mixture of 1.0 part of methyl 3-nor-4-desmethyl-11-oxo-18β-oleana-4,12-dien-30-oate, 9.82 parts of pyridine and 0.675 parts of osmium tetroxide is stirred for 30 minutes. After that time, 9.82 parts of pyridine and 1.2 parts of sodium bisulfite in 20 parts of water is added and that solution is stirred at 50° for 30 minutes. The reaction mixture is diluted with 110 parts of water and the precipitate which forms is collected by filtration, washed with water and dried under reduced pressure to yield methyl 3-nor-4,5-dihydroxy-4-desmethyl-11-oxo-18β-olean-12-en-30-oate, displaying infrared absorption maxima at 2.90, 5.78, 6.00 and 6.19 microns.

EXAMPLE 6

0.500 Part of methyl 3-nor-4,5-dihydroxy-4-desmethyl-11-oxo-18β-olean-12-en-30-oate is dissolved in 176 parts of anhydrous benzene and treated, while stirring, with 0.100 part portions of lead tetraacetate until thin layer chromatography indicates all the starting material is consumed. After stirring for an additional hour, 2.23 parts of ethylene glycol is added and the mixture is washed with water and then aqueous sodium bisulfite, dried over anhydrous magnesium sulfate and evaporated to dryness. The resulting material is triturated with methanol to afford crystalline methyl 4,5-seco-4,4-desmethyl-3,5,11-trioxo-18β-olean-12-en-30-oate. That compound exhibits absorption maxima in the nuclear magnetic resonance spectrum at about 51, 70, 81.5, 84, 127.5, 223 and 350 Hertz. That compound is further characterized by absorption in the ultraviolet spectrum at about 249.5 millimicrons.

EXAMPLE 7

A mixture of 8.8 parts of methyl 4,5-seco-4,4-desmethyl-3,5,11-trioxo-18β-olean-12-en-30-oate, a solution of 2 parts of potassium hydroxide dissolved in 79.2 parts of methanol, and 158.4 parts of methanol is stirred at reflux under nitrogen for 30 minutes, then cooled and neutralized with 7.35 parts of acetic acid. To that solution is added 50 parts of water and the mixture is evaporated almost to dryness under reduced pressure. The resulting crystalline material is triturated with water, filtered and dried under reduced pressure to yield methyl 4,4-desmethyl-3,11-dioxo-18β-oleana-4,12-dien-30-oate melting at about 237.5°–238°.

EXAMPLE 8

To a solution consisting of 9.6 parts of potassium tert.-butoxide in 158 parts of tert.-butanol, heated to reflux is added a boiling suspension of 12.4 parts of methyl 4,4-desmethyl-3,11-dioxo-18β-oleana-4,12-dien-30-oate in 126 parts of tert.-butanol. To the refluxing mixture is added, dropwise, 10.0 parts of methyl iodide in 79 parts of tert.-butanol over a 3 hour period. Then 9.6 parts of potassium tert.-butoxide is added, followed by 10.0 parts of methyl iodide in 59 parts of tert.-butanol. That addition takes place over a 10 minute period. The resulting mixture is refluxed for 1 hour, then treated successively with 20 parts of water, 12 parts of potassium carbonate, and 45.5 parts of methyl iodide. Refluxing is continued for an additional 4 hours, after which time the solution is cooled and the solvent is evaporated to leave a wet solid. That material is partitioned between benzene:ethyl acetate:diethyl ether and water. The organic and aqueous phases are separated and the organic phase is washed with saturated sodium chloride and then evaporated to a solid. The solid remaining is chromatographed on silicic acid using benzene-ethyl acetate as eluant. Methyl 3,11-dioxo-18β-oleana-5,12-dien-30-oate is obtained after elution with 5 percent ethyl acetate-95 percent benzene. Pure product, melting at about 272°–273°, is obtained after the recrystallization from methylene chloride-methanol and exhibits nuclear magnetic resonance maxima at δ5.56 (q,J=6, 2, 1 Hertz), maxima in the infrared spectrum at about 1650, 1708 and 1726 reciprocal centimeters, and maxima in the ultraviolet spectrum at about 250.5 nanometers with a molecular extinction coefficient of about 11,500. That compound is represented structurally by the following formula

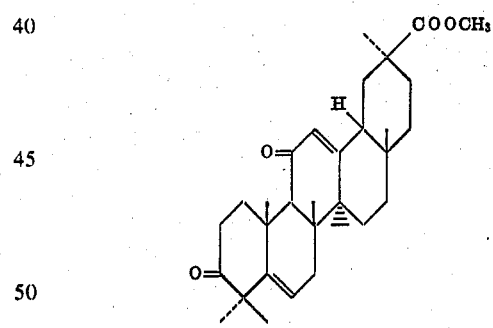

EXAMPLE 9

A solution consisting of 1.35 parts of methyl 3,11-dioxo-18β-oleana-5,12-dien-30-oate, 3.5 parts of lithium tri-tert.-butoxy aluminum hydride and 28 parts of tetrahydrofuran is allowed to stir at 22° for 2 hours. Then the reaction mixture is poured on ice, carefully acidified with concentrated hydrochloric acid and extracted with diethyl ether and then with chloroform. The organic extracts are combined, dried over calcium sulfate, filtered and evaporated to a solid. The remaining solid is crystallized from methylene chloride-methanol to afford pure methyl 3β-hydroxy-11-oxo-18β-oleana-5,12-dien-30-oate, exhibiting maxima in the nuclear magnetic resonance spectrum at δ5.60, maxima in the infrared spectrum at about 1654, 1736 and 3640 reciprocal centimeters and maxima in the ultraviolet spectrum at about 250.5 nanometers with a molar extinction coefficient of about 11,100. That compound is further represented by the following structural formula

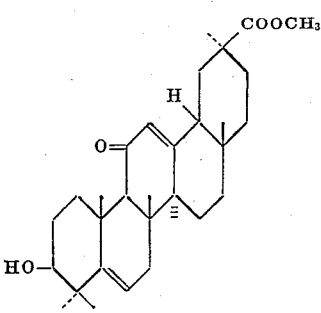

EXAMPLE 10

4.5 Parts of methyl 3β-hydroxy-11-oxo-18β-oleana-5,12-dien-30-oate and 5.0 parts of lithium iodide monohydrate are refluxed in 80 parts by volume of 2,4,6-collidine for 4 hours. At the beginning of the reflux period, the water which is present is removed by distillation of a small quantity of the collidine. After the reflux period is complete, the cooled reaction mixture is partitioned between 500 parts by volume of 4N hydrochloric acid and 300 parts by volume of ethyl acetate-ethyl ether. The organic phase is washed with dilute sodium chloride and then with saturated sodium chloride, decolorized with charcoal, filtered and evaporated to dryness. The material remaining is crystallized from methylene chloride-methanol to afford pure 3β-hydroxy-11-oxo-18β-oleana-5,12-dien-30-oic acid. That compound exhibits maxima in the nuclear magnetic resonance spectrum at about δ5.76 and δ3.50, maxima in the infrared spectrum at about 3700, 3620, 3520, 2400–2800, 1743, 1705 and 1650 reciprocal centimeters, and maxima in the ultraviolet spectrum at about 251 nanometers with a molar extinction coefficient of about 10,300. That compound is represented by the following structural formula

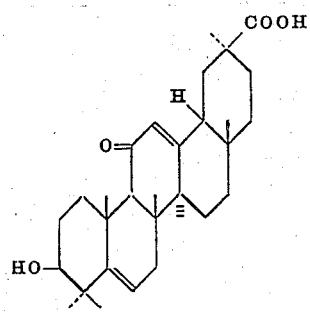

EXAMPLE 11

By substituting an equivalent quantity of ethyl 3-nor-4-isopropylidene-4,4-desmethyl-11-oxo-18β-olean-12-en-30-oate in the procedure of Example 1 and otherwise successively following the procedures of Example 1, 2, 3, 4, 5, 6 and 7, there is afforded ethyl 4,4-desmethyl-3,11-dioxo-18β-oleana-4,12-dien-30-oate.

EXAMPLE 12

By substituting an equivalent quantity of ethyl 4,4-desmethyl-3,11-dioxo-18β-oleana-4,12-dien-30-oate in the procedure of Example 8, there is afforded ethyl 3,11-dioxo-18β-oleana-5,12-dien-30-oate.

EXAMPLE 13

Substitution of an equivalent quantity of ethyl 3,11-dioxo-18β-oleana-5,12-dien-30-oate in the procedure of Example 9 affords ethyl 3β-hydroxy-11-oxo-18β-oleana-5,12-dien-30-oate.

What is claimed is:

1. A compound of the formula

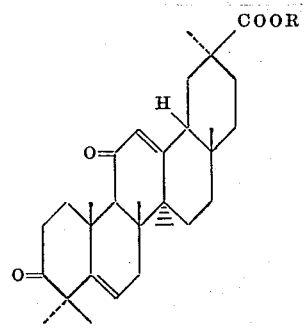

wherein R is hydrogen or a lower alkyl radical containing 1–7 carbon atoms inclusive and X is a carbonyl or β-hydroxy=methylene radical.

2. As in claim 1, a compound of the formula

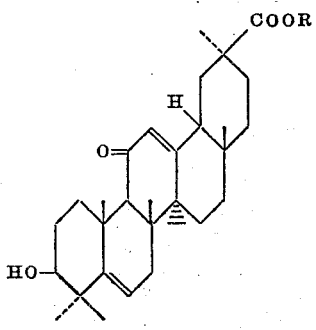

wherein R is hydrogen or a lower alkyl radical containing 1–7 carbon atoms inclusive.

3. As in claim 1, a compound of the formula

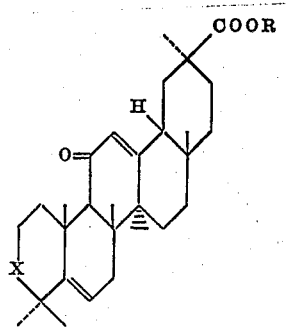

wherein R is hydrogen or a lower alkyl radical containing 1–7 carbon atoms.

4. As in claim 1, a compound which is methyl 3,11-dioxo-18 β-oleana-5,12-dien-30-oate.

5. As in claim 1, the compound which is methyl 3 β-hydroxy-11-oxo-18 β-oleana-5,12-dien-30-oate.

6. As in claim 1, the compound which is 3 β-hydroxy-11-oxo-18 β-oleana-5,12-dien-30-oic acid.

* * * * *

UNITED STATES PATENT OFFICE
CERTIFICATE OF CORRECTION

Patent No. 3,832,382  Dated August 27, 1974

Inventor(s) John S. Baran and Barnett Pitzele

It is certified that error appears in the above-identified patent and that said Letters Patent are hereby corrected as shown below:

Column 3, line 45, "tri-tert." should be -- tri-_tert._ --.

Column 4, line 44, "12-ene" should be -- 12-en --.

Column 6, line 6, "tert.-butoxide" should be -- _tert._-butoxide --.

Column 6, line 6, "tert.-butanol" should be -- _tert._-butanol --.

Column 6, line 9, "tert.-butanol" should be -- _tert._-butanol --.

Column 6, line 11, "tert.-butanol" should be -- _tert._-butanol --.

Column 6, line 12, "tert.-butoxide" should be -- _tert._-butoxide --.

Column 6, line 13, "tert.-" should be -- _tert._- --.

Column 6, line 58, "tri-tert.-" should be -- tri-_tert._- --.

Column 8, line 7, "3,1-" should be -- 3,11- --.

Column 8, line 8, "1-dioxo" should be -- dioxo --.

UNITED STATES PATENT OFFICE
CERTIFICATE OF CORRECTION

Patent No. 3,832,382  Dated August 27, 1974

Inventor(s) John S. Baran and Barnett Pitzele  PAGE - 2

It is certified that error appears in the above-identified patent and that said Letters Patent are hereby corrected as shown below:

Column 8, Claim 1 formula

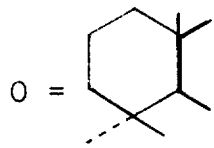   should be   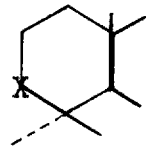

Column 8, line 33, "hydroxy=methylene" should be -- hydroxymethylene --.

Column 8, Claim 2 formula

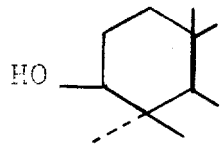   should be O =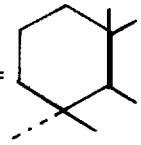

Column 8, Claim 3 formula

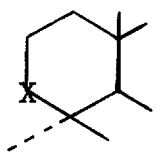   should be HO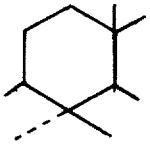

Signed and sealed this 3rd day of June 1975.

(SEAL)
Attest:

RUTH C. MASON
Attesting Officer

C. MARSHALL DANN
Commissioner of Patents
and Trademarks